US009617805B1

(12) United States Patent
Lafitte

(10) Patent No.: US 9,617,805 B1
(45) Date of Patent: Apr. 11, 2017

(54) SWIVEL ASSEMBLY AND DISASSEMBLY APPARATUSES AND METHODS

(71) Applicant: Christopher M. Lafitte, Bossier City, LA (US)

(72) Inventor: Christopher M. Lafitte, Bossier City, LA (US)

( * ) Notice: Subject to any disclaimer, the term of this patent is extended or adjusted under 35 U.S.C. 154(b) by 197 days.

(21) Appl. No.: 14/460,070

(22) Filed: Aug. 14, 2014

(51) Int. Cl.
| | |
|---|---|
| *B23P 19/04* | (2006.01) |
| *E21B 19/16* | (2006.01) |
| *B23P 19/06* | (2006.01) |
| *B25H 1/18* | (2006.01) |
| *B23P 19/12* | (2006.01) |
| *B25H 1/16* | (2006.01) |
| *B25H 1/00* | (2006.01) |
| *B25H 1/12* | (2006.01) |

(52) U.S. Cl.
CPC ............ *E21B 19/16* (2013.01); *B23P 19/061* (2013.01); *B23P 19/04* (2013.01); *B23P 19/12* (2013.01); *B25H 1/0035* (2013.01); *B25H 1/0042* (2013.01); *B25H 1/12* (2013.01); *B25H 1/16* (2013.01); *B25H 1/18* (2013.01); *Y10T 29/53* (2015.01); *Y10T 29/5367* (2015.01); *Y10T 29/53917* (2015.01); *Y10T 29/53961* (2015.01); *Y10T 29/54* (2015.01)

(58) Field of Classification Search
CPC ......... Y10T 29/49815; Y10T 29/49819; Y10T 29/49822; Y10T 29/49824; Y10T 29/49895; Y10T 29/49998; Y10T 29/53; Y10T 29/53104; Y10T 29/53539; Y10T 29/5367; Y10T 29/53687; Y10T 29/53691; Y10T 29/53696; Y10T 29/53917; Y10T 29/53952; Y10T 29/93957; Y10T 29/53961; Y10T 29/53974; Y10T 29/53978; Y10T 29/53987; Y10T 29/54; B25H 1/0021; B25H 1/0035; B25H 1/0042; B25H 1/0057; B25H 1/0064; B25H 1/08; B25H 1/10; B25H 1/12; B25H 1/14; B25H 1/16; B25H 1/18; B23P 19/04; B23P 19/061; B23P 19/10; B23P 19/107; B23P 19/12
USPC ..................................... 269/58, 59
See application file for complete search history.

(56) References Cited

U.S. PATENT DOCUMENTS

| | | | | |
|---|---|---|---|---|
| 1,981,925 | A * | 11/1934 | Russell | ............... B25B 27/00 29/275 |
| 2,031,868 | A * | 2/1936 | Toscano | ............... A43D 23/025 12/122 |
| 2,312,914 | A * | 3/1943 | Koszeghy | ............... B21D 1/12 269/104 |
| 2,763,053 | A * | 9/1956 | Anderson | .......... B23K 37/0452 246/28 F |

(Continued)

FOREIGN PATENT DOCUMENTS

| | | | | | |
|---|---|---|---|---|---|
| FR | WO 2012013886 | A1 * | 2/2012 | ............ | B60K 1/04 |
| FR | 2985676 | A1 * | 7/2013 | ............ | B23P 19/042 |

*Primary Examiner* — Essama Omgba
(74) *Attorney, Agent, or Firm* — R. Keith Harrison

(57) ABSTRACT

Swivel assembly and disassembly apparatuses for assembly and disassembly of a swivel include an apparatus base, a bearing collection basin carried by the apparatus base, a swivel head mount carried by the bearing collection basin, a swivel assembly/disassembly head carried by the swivel head mount and a swivel mounting mechanism carried by the swivel assembly/disassembly head.

14 Claims, 14 Drawing Sheets

(56) References Cited

U.S. PATENT DOCUMENTS

| | | | | |
|---|---|---|---|---|
| 2,969,231 | A * | 1/1961 | Mills | B25H 1/0007 248/183.2 |
| 3,747,192 | A * | 7/1973 | Harris | B23P 19/02 29/237 |
| 4,010,942 | A * | 3/1977 | Ward | B25H 1/0007 269/15 |
| 4,140,306 | A * | 2/1979 | Wheeler | B25H 1/0007 269/15 |
| 4,145,006 | A * | 3/1979 | Webb | B25H 1/00 269/69 |
| 5,141,211 | A * | 8/1992 | Adams, Jr. | B60C 25/04 269/16 |
| 5,158,141 | A * | 10/1992 | Saliger | E21B 41/04 166/341 |
| 5,232,035 | A * | 8/1993 | Adams, Jr. | B25H 1/0021 157/1.17 |
| 5,335,407 | A * | 8/1994 | Verkerk | H01Q 1/125 254/134 |
| 5,918,357 | A * | 7/1999 | Pennell | A47F 7/08 269/15 |
| 6,249,985 | B1 * | 6/2001 | Piko | B23Q 1/5406 33/503 |
| 8,360,408 | B2 * | 1/2013 | Bereznicki | B25J 19/0004 187/343 |
| 9,004,137 | B2 * | 4/2015 | Voegeli | B25H 1/0014 157/1.5 |
| 2010/0065999 | A1 * | 3/2010 | Bereznicki | B25J 19/0004 269/59 |
| 2012/0074326 | A1 * | 3/2012 | Pausch | G01T 3/06 250/362 |
| 2013/0088008 | A1 * | 4/2013 | Evrard | B23P 6/00 285/272 |
| 2015/0183282 | A1 * | 7/2015 | Voegeli | B25H 1/0014 157/14 |

\* cited by examiner

US 9,617,805 B1

SWIVEL ASSEMBLY AND DISASSEMBLY APPARATUSES AND METHODS

FIELD

Illustrative embodiments of the disclosure generally relate to swivels for subterranean hydrocarbon production wells. More particularly, illustrative embodiments of the disclosure relate to swivel assembly and disassembly apparatuses and methods for assembling and disassembling swivels for hydrocarbon production wells.

BACKGROUND

The background description provided herein is solely for the purpose of generally presenting the context of various illustrative embodiments of the disclosure. Aspects of the background description are neither expressly nor impliedly admitted as prior art against the claimed subject matter.

A swivel is a surface-mounted component in a drilling rig which is operated to drill a subterranean hydrocarbon production well. The swivel may function as the entry point for drilling fluids and as a load transfer point between the drill string and the rig. In some applications, the swivel may be used as a data gathering point for logging the well and for monitoring drill string dynamics.

The swivel may include multiple curved swivel segments which are rotatable with respect to each other. Multiple ball bearings may be seated in ball bearing grooves between the interfacing swivel segments. Periodic assembly and/or disassembly of the swivel may be necessary for cleaning, maintenance and/or replacement of the various components of the swivel. Conventional methods of assembling the swivel may include placing a first swivel segment in a vice and attaching the remaining swivel segments with ball bearings to the first swivel segment. The assembled swivel is then removed from the vice and attached to the drill string. Disassembly of the swivel may be carried out in like manner. However, conventional techniques and methods for assembling and disassembling a swivel are laborious and time-consuming. Moreover, the ball bearings have a tendency to be inadvertently dropped during installation, resulting in their frequent loss or displacement.

Accordingly, swivel assembly and disassembly apparatuses and methods for expeditiously assembling and disassembling swivels for hydrocarbon production wells are needed.

SUMMARY

Illustrative embodiments of the disclosure are generally directed to swivel assembly and disassembly apparatuses for assembly and disassembly of a swivel. An illustrative embodiment of the apparatuses includes an apparatus base, a bearing collection basin carried by the apparatus base, a swivel head mount carried by the bearing collection basin, a swivel assembly/disassembly head carried by the swivel head mount and a swivel mounting mechanism carried by the swivel assembly/disassembly head.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper", "lower", "side" and "end" are intended to be used in an illustrative and not a limiting sense. In some applications, for example, those elements which are identified as "lower" may be located in other spatial relationships relative to those elements which are identified as "lower" in the following detailed description.

Figure 8:
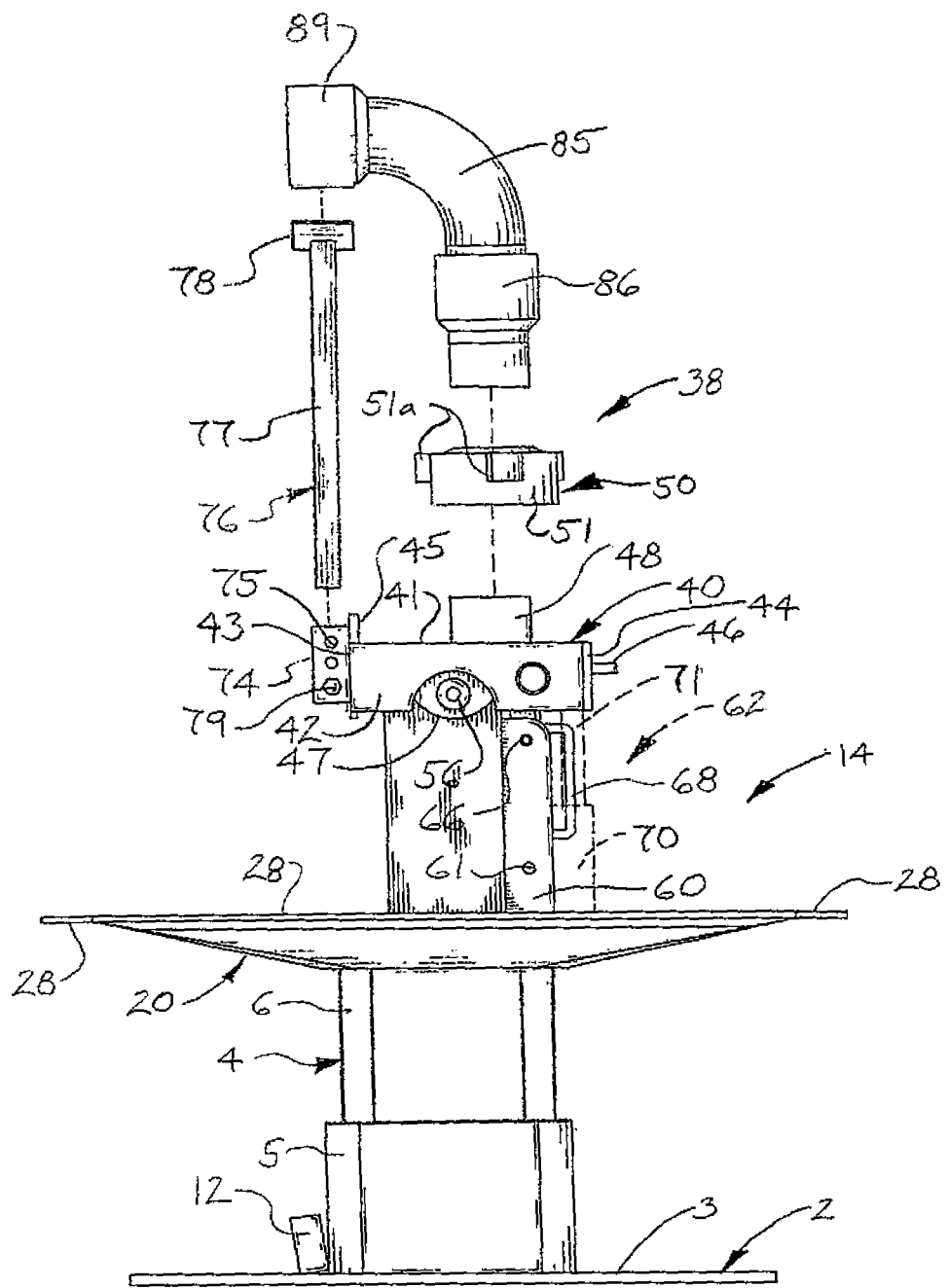
FIG. 8 is an exploded side view of an illustrative swivel assembly and disassembly apparatus with a hammer nut detached from the swivel assembly/disassembly head, a first swivel segment detached from the hammer nut and a swivel support arm detached from between the swivel assembly/disassembly head and the first swivel segment.
Figure 9:
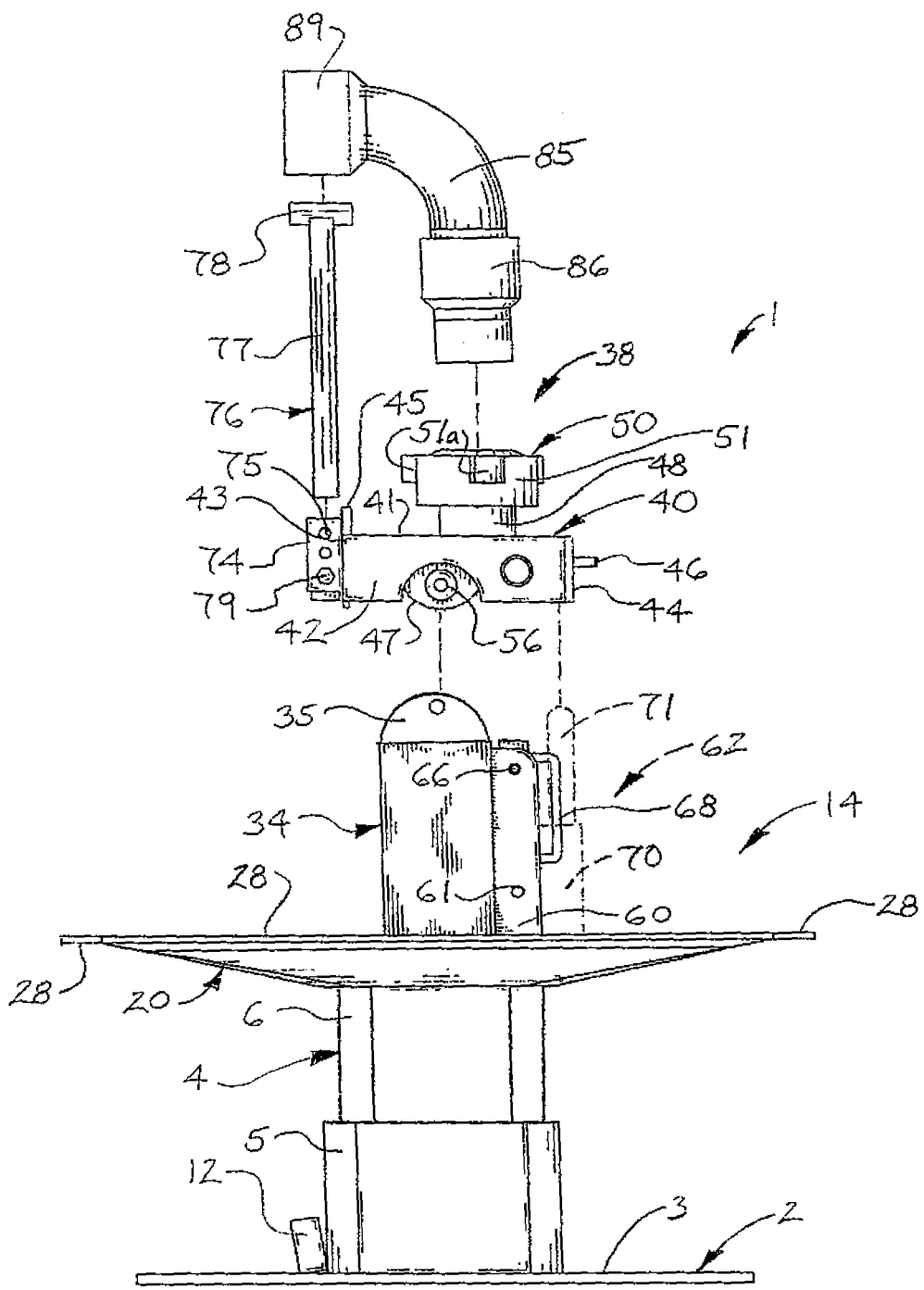
FIG. 9 is an exploded side view of an alternative illustrative swivel assembly and disassembly apparatus with the swivel assembly/disassembly head detached from a swivel head mount, a first swivel segment detached from the swivel assembly/disassembly head and a swivel support arm detached from between the swivel assembly/disassembly head and the first swivel segment.
Figure 10:
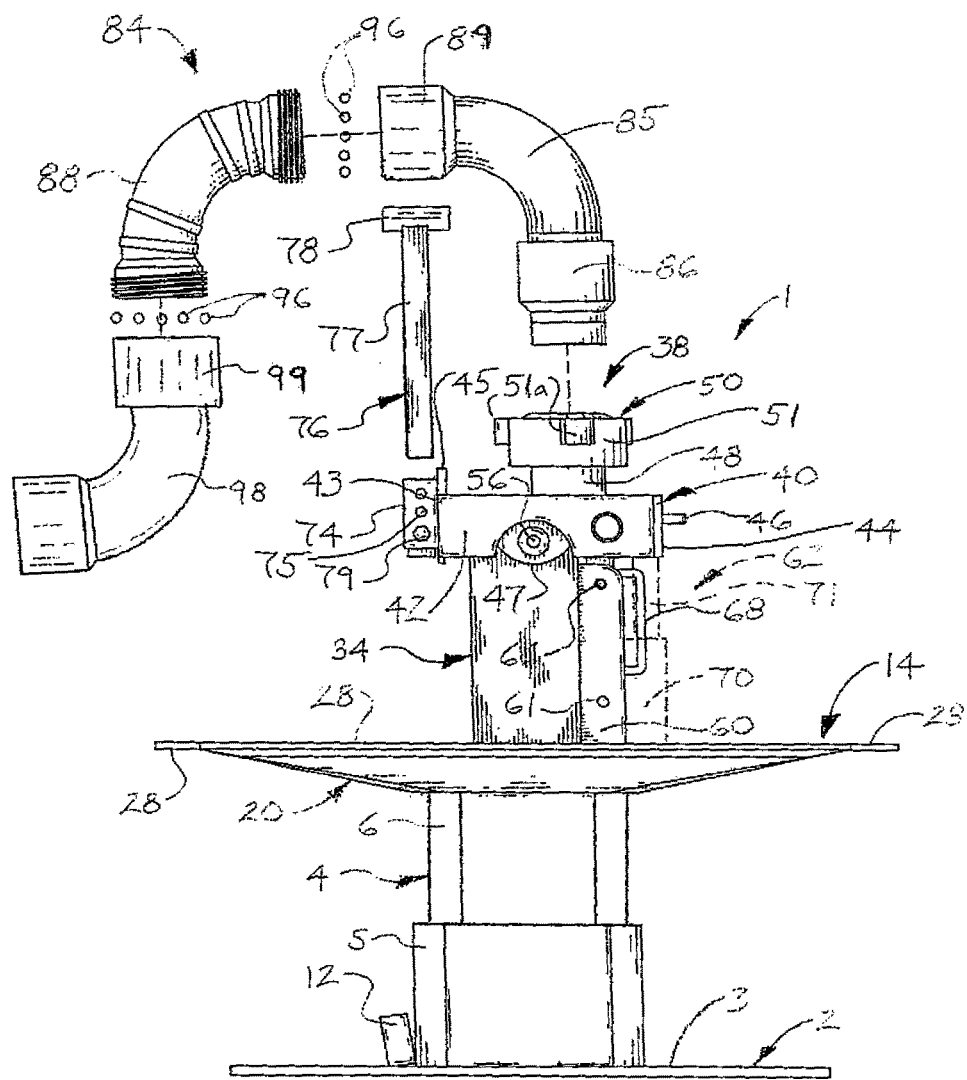
FIG. 10 is a side view of an illustrative swivel assembly and disassembly apparatus with a swivel illustrated in exploded view in exemplary assembly and disassembly of the swivel according to typical application of the apparatus.

Referring initially to FIGS. 1-10 of the drawings, an illustrative embodiment of the swivel assembly and disassembly apparatus, hereinafter apparatus, is generally indicated by reference numeral 1. As illustrated in FIG. 10, in typical application, which will be hereinafter further described, the apparatus 1 may facilitate assembly and/or disassembly of a swivel 84 that may connect a drill string (not illustrated) to a top drive unit (not illustrated) on a hydrocarbon production well typically in the conventional manner. Periodic assembly and/or disassembly of the swivel 84 may be necessary for cleaning, maintenance and/or replacement of the various components of the swivel 84 as is known by those skilled in the art. The apparatus 1 may include an apparatus base 2, a bearing collection basin 14 supported by the apparatus base 2, a swivel head mount 34 upward-standing from the bearing collection basin 14, a swivel assembly/disassembly head 40 on the swivel head mount 34 and a swivel mounting mechanism 38 on the swivel assembly/disassembly head 40. The swivel mounting mechanism 38 facilitates assembly of the swivel 84 on the swivel assembly/disassembly head 40 as will be hereinafter described.

The swivel 84 may have a standard or conventional design with a curved first swivel segment 85, a curved second swivel segment 88 which is coupled to the first swivel segment 85 and a curved third swivel segment 98 which is coupled to the second swivel segment 88. Swivel attachment sleeves 86, 89, 99 may facilitate coupling of the swivel segments to each other in the assembled swivel 84. Ball bearings 96 are typically seated in bearing grooves (not illustrated) in each swivel attachment sleeve 86 to facilitate 360-degree rotation of the swivel segments to each other. Accordingly, during assembly of the swivel 84, the ball bearings 96 are placed in the bearing grooves as the attachments between the adjacent swivel segments are made. During assembly or upon subsequent disassembly of the swivel 84, the ball bearings 96 may have a tendency to inadvertently fall from the bearing grooves in the swivel attachment sleeves 86. Thus, the bearing collection basin 14 of the apparatus 1 catches the ball bearings 96 to prevent their loss or displacement and enable personnel to expeditiously gather the ball bearings 96 for subsequent assembly of the swivel 84. Additionally, the swivel assembly/disassembly head 40 may facilitate orientation of the swivel segments at various positions to enable personnel to expeditiously couple or uncouple the swivel segments in assembly and disassembly, respectively, of the swivel 84.

Figure 3:
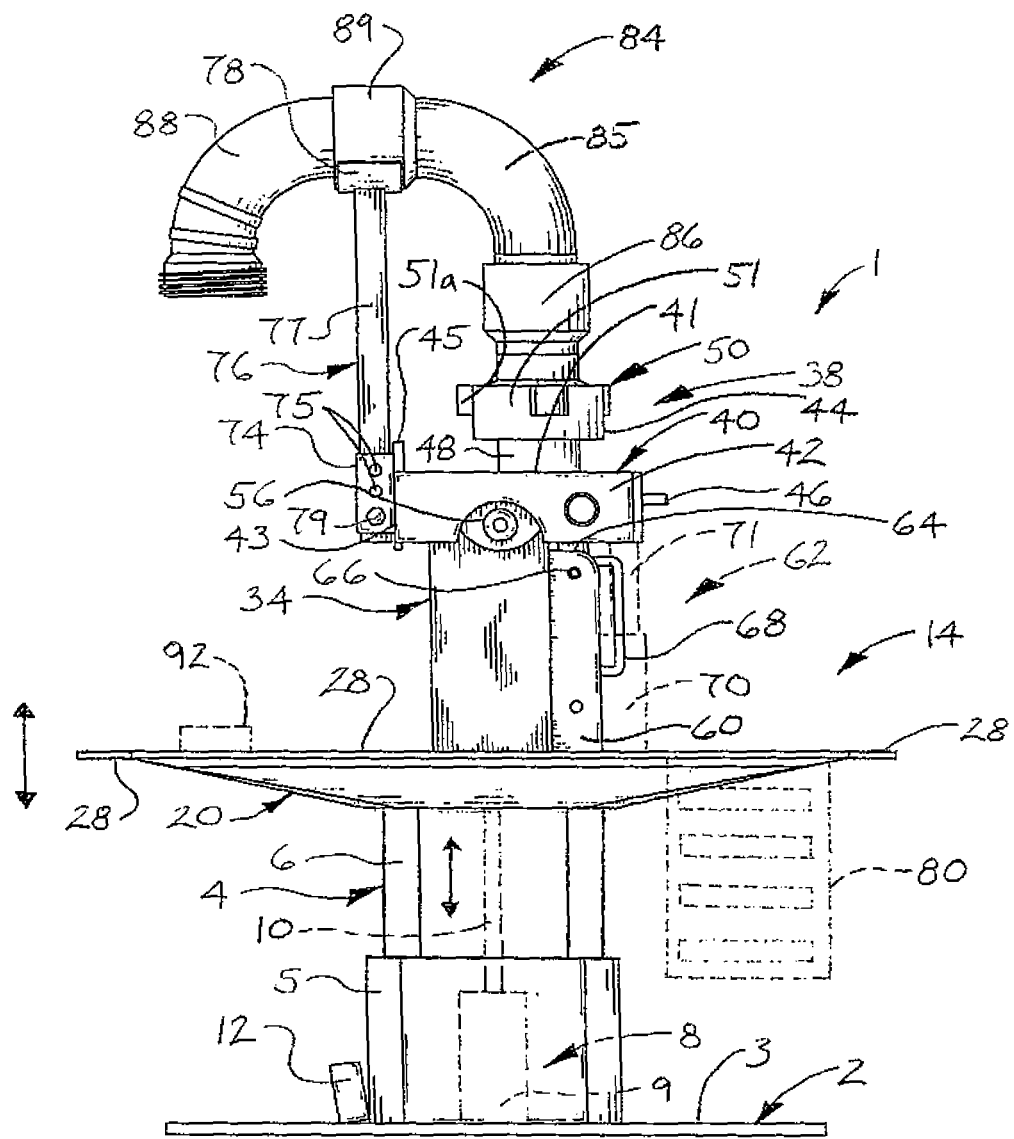
FIG. 3 is a side view of an illustrative swivel assembly and disassembly apparatus with the swivel assembly/disassembly head deployed in an upright position and the partially-assembled swivel on the swivel assembly/disassembly head according to typical application of the apparatus.
Figure 4:
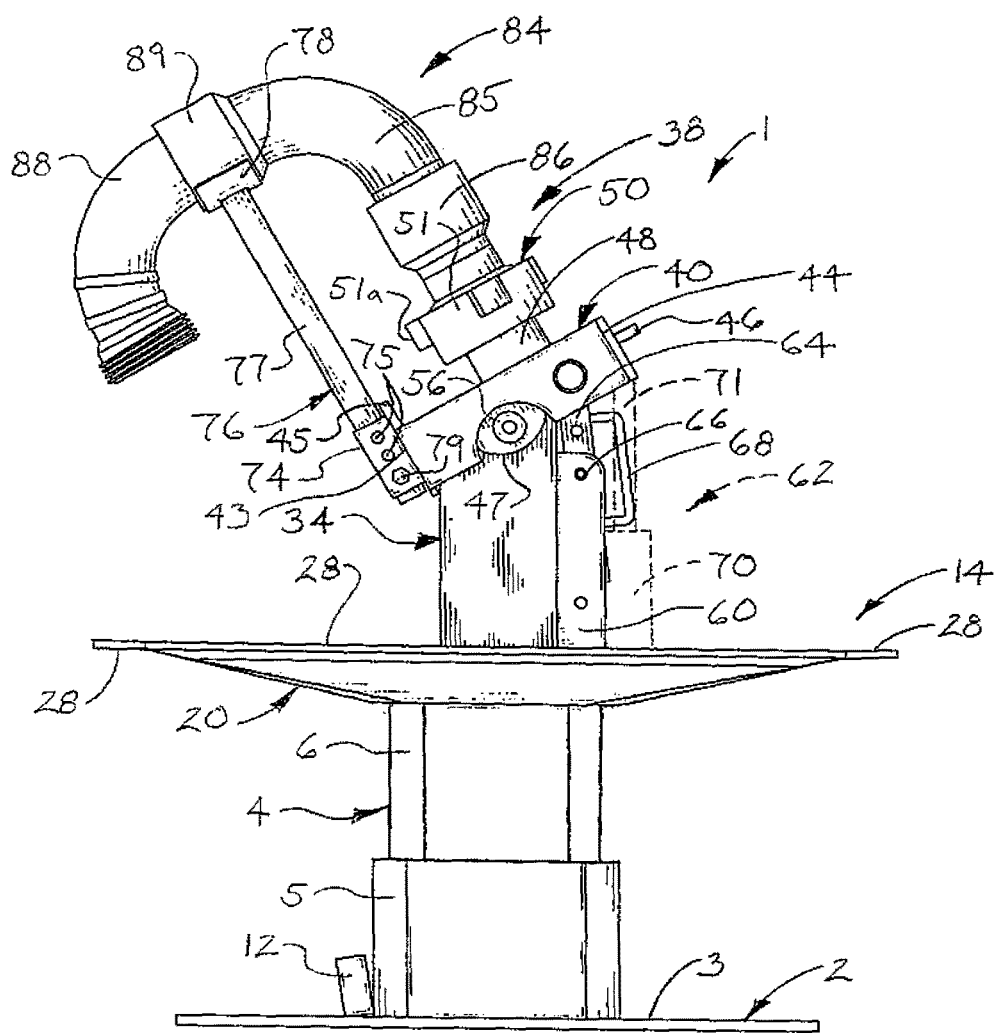
FIG. 4 is a side view of an illustrative swivel assembly and disassembly apparatus with the swivel assembly/disassembly head tilted in a forward position and the partially-assembled swivel on the swivel assembly head according to typical application of the apparatus.
Figure 5:
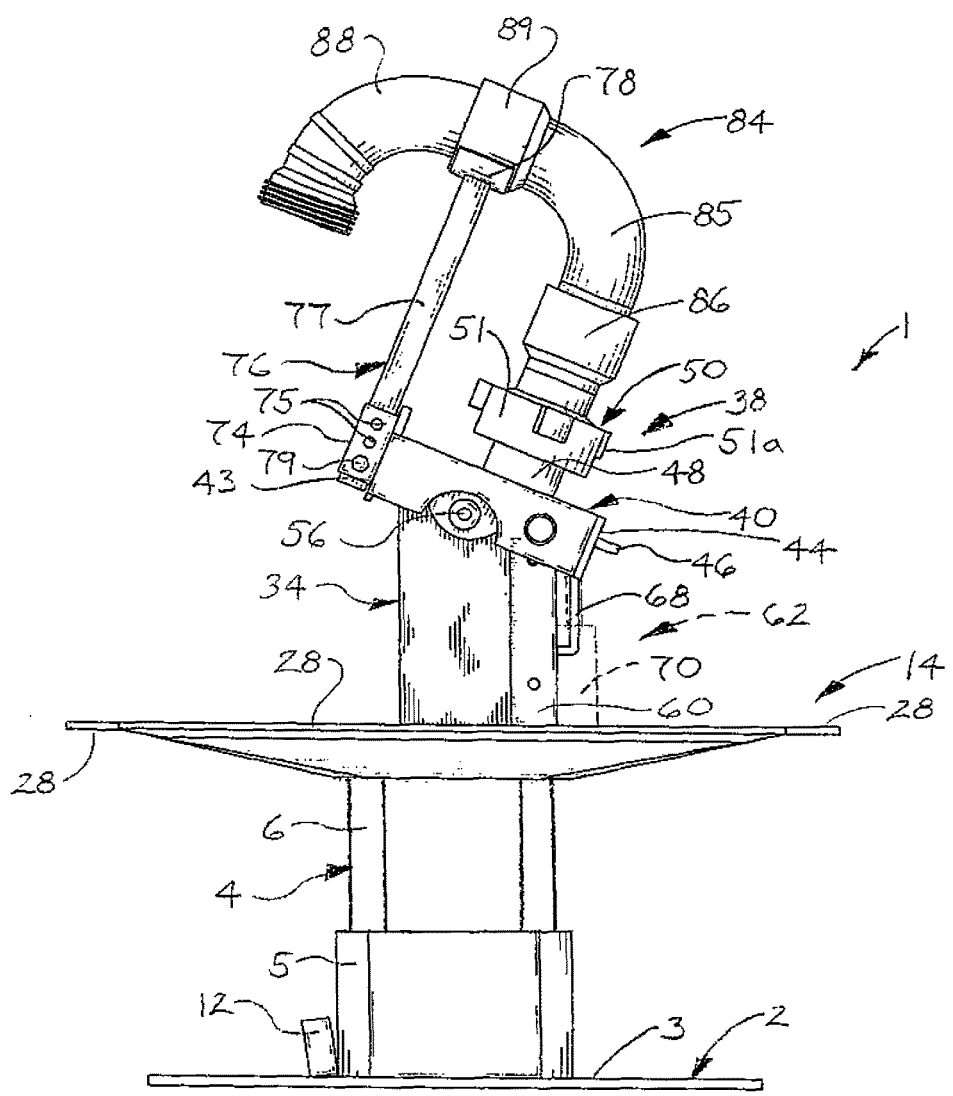
FIG. 5 is a side view of an illustrative swivel assembly and disassembly apparatus with the swivel assembly/disassembly head tilted in a rearward position and the partially-assembled swivel on the swivel assembly/disassembly head according to typical application of the apparatus.

The apparatus base 2 may have any design which is suitable for the purpose of supporting the bearing collection basin 14 on a floor or other support surface (not illustrated). In some embodiments, the apparatus base 2 of the apparatus 1 may include a flat base plate 3. A basin support 4 may extend upwardly from the base plate 3. In some embodiments, the apparatus base 2 may be selectively height-adjustable. Accordingly, the basin support 4 may include a lower basin support member 5 which is upward-standing from the base plate 3. An upper basin support member 6 may be telescopically extendable from the lower basin support member 5. As illustrated in FIG. 3, a basin height adjusting mechanism 8 (illustrated in phantom) may operatively engage the bearing collection basin 14 to facilitate selective adjustment in the height of the bearing collection basin 14 as the upper basin support member 6 is telescopically extended from and retracted into the lower basin support member 5, as indicated by the arrows. In some embodiments, the basin height adjusting mechanism 8 may include a pneumatic or hydraulic height adjusting mechanism cylinder 9 which is supported by the base plate 3. A height adjusting mechanism piston 10 may be selectively extendable from and retractable into the height adjusting mechanism cylinder 9 and may engage the bearing collection basin 14. Upon selective extension and retraction, the height adjusting mechanism piston 10 raises and lowers, respectively, the bearing collection basin 14 to a height which accords with the preferences of the swivel assembly or disassembly personnel. In other embodiments, the basin height adjusting mechanism 8 may include any apparatus, device or mechanism which is deemed suitable by those skilled in the art for the purpose of selectively raising and lowering the bearing collection basin 14. Non-limiting examples of apparatuses, mechanisms or devices which are suitable for the basin height adjusting mechanism 8 include manual actuation devices, hydraulic actuation devices, pneumatic actuation devices, electric actuation devices and screw actuation devices.

Figure 6:
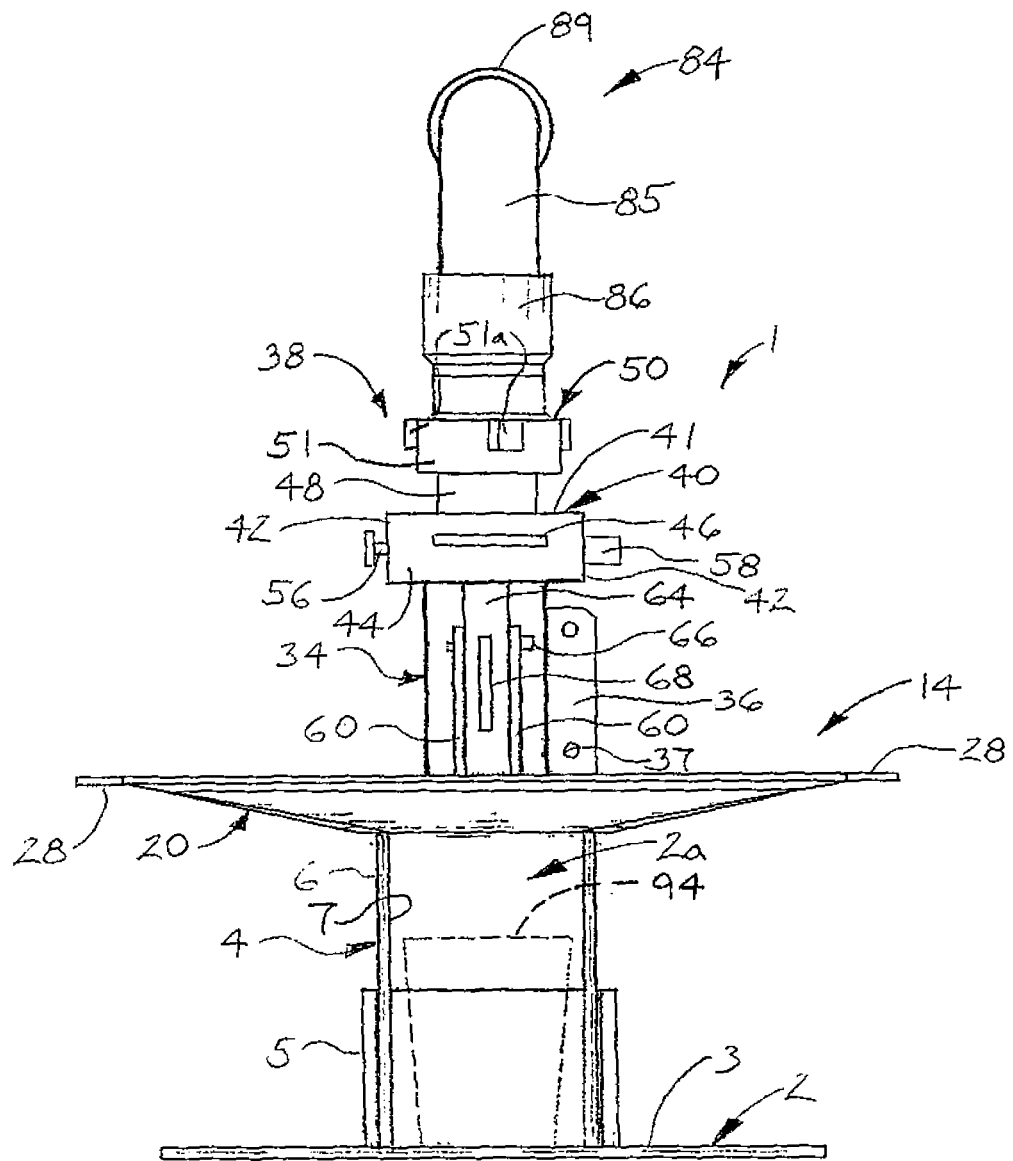
FIG. 6 is a rear view of an illustrative swivel assembly and disassembly apparatus with the swivel assembly/disassembly head deployed in the upright position and the partially-assembled swivel on the swivel assembly/disassembly head.
Figure 7:
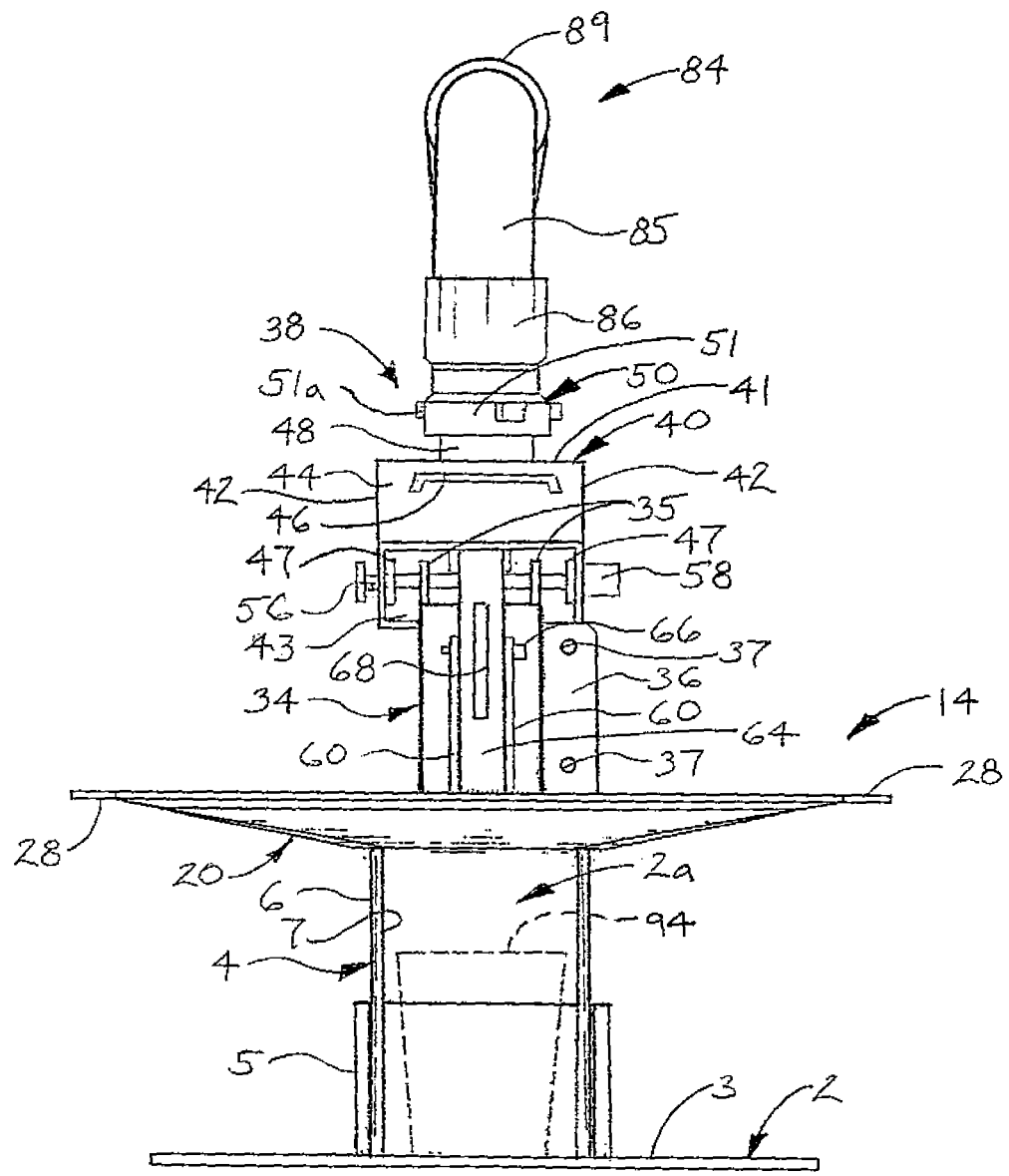
FIG. 7 is a rear view of an illustrative swivel assembly and disassembly apparatus with the swivel assembly/disassembly head tilted in the forward position and the partially-assembled swivel on the swivel assembly/disassembly head.

As illustrated in FIGS. 6 and 7, the apparatus base 2 may have an apparatus base interior 2a. In some embodiments, the basin height adjusting mechanism 8 (FIG. 3) may be disposed within the apparatus base interior 2a of the apparatus base 2. At least one bearing container opening 7 may be provided in at least one side of the basin support 4 of the apparatus base 2 in communication with the apparatus base interior 2a. The bearing container opening 7 may be sized and configured to accommodate a bearing collection container 94 (illustrated in phantom) as the bearing collection container 94 is placed inside or removed from the apparatus base interior 2a of the apparatus base 2 for purposes which will be hereinafter described.

The bearing collection basin 14 (FIG. 2A) has a basin interior 24 which receives or collects the errant ball bearings 96 in the event that the ball bearings 96 inadvertently fall during assembly or disassembly of the swivel 84. The bearing collection basin 14 may have any shape, configuration or design which is suitable for this purpose. In some embodiments, the bearing collection basin 14 may include a basin bottom panel 15 having multiple bottom panel edges 16 and truncated panel corners 17. At least one bearing opening 18 may extend through the basin bottom panel 15. Multiple main basin panels 20 may angle outwardly and upwardly from the respective bottom panel edges 16 of the basin bottom panel 15. Each main basin panel 20 may have a main panel inner edge 21 which extends along a corresponding bottom panel edge 16 of the basin bottom panel 15, a main panel outer edge 22 which is spaced-apart and parallel to the main panel inner edge 21 and a pair of main panel side edges 23 which extend from the main panel inner edge 21 to the main panel outer edge 22. A basin corner panel 26 may extend between the neighboring main panel side edges 23 of each pair of adjacent main basin panels 20. Each basin corner panel 26 may be disposed at an obtuse angle to the adjacent main basin panels 20. Each basin corner panel 26 may be generally triangular in shape, gradually narrowing from a corresponding truncated panel corner 17 of the basin bottom panel 15 to a corresponding basin corner 19 of the bearing collection basin 14. In some embodiments, a basin rim 28 may extend outwardly from the main panel outer edge 22 of each main basin panel 20.

It will be appreciated by those skilled in the art that the presence of the basin corner panels 26 between the main basin panels 20 may prevent or minimize ricocheting of the ball bearings 96 within and out of the basin interior 24 in the event that the ball bearings 96 inadvertently fall into the basin interior 24 during assembly or disassembly of the swivel 84. This expedient may prevent or minimize the likelihood that the ball bearings 96 inadvertently spill over from the basin interior 24 and become lost or misplaced. However, it will be recognized and understood that a variety of alternative designs and shapes may be used for the bearing collection basin 14 without departing from the scope of the disclosure. These shapes may include but are not limited to circular, triangular, pentagonal, hexagonal and octagonal shapes.

Figure 2:
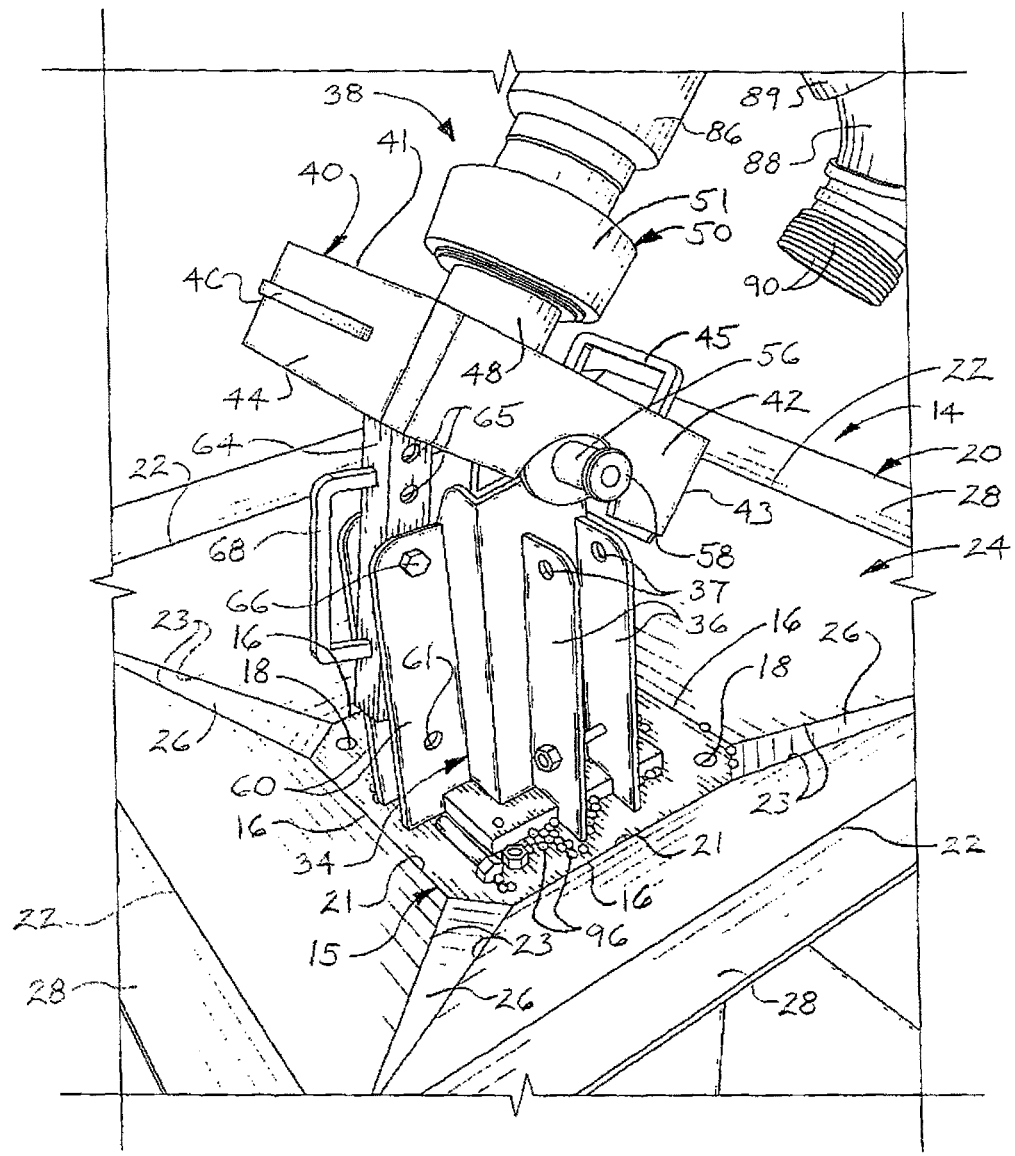
FIG. 2 is a rear perspective view of a typical swivel assembly/disassembly head deployed in a forward-tilted position in partial assembly of the swivel according to typical application of the apparatus.
Figure 2A:
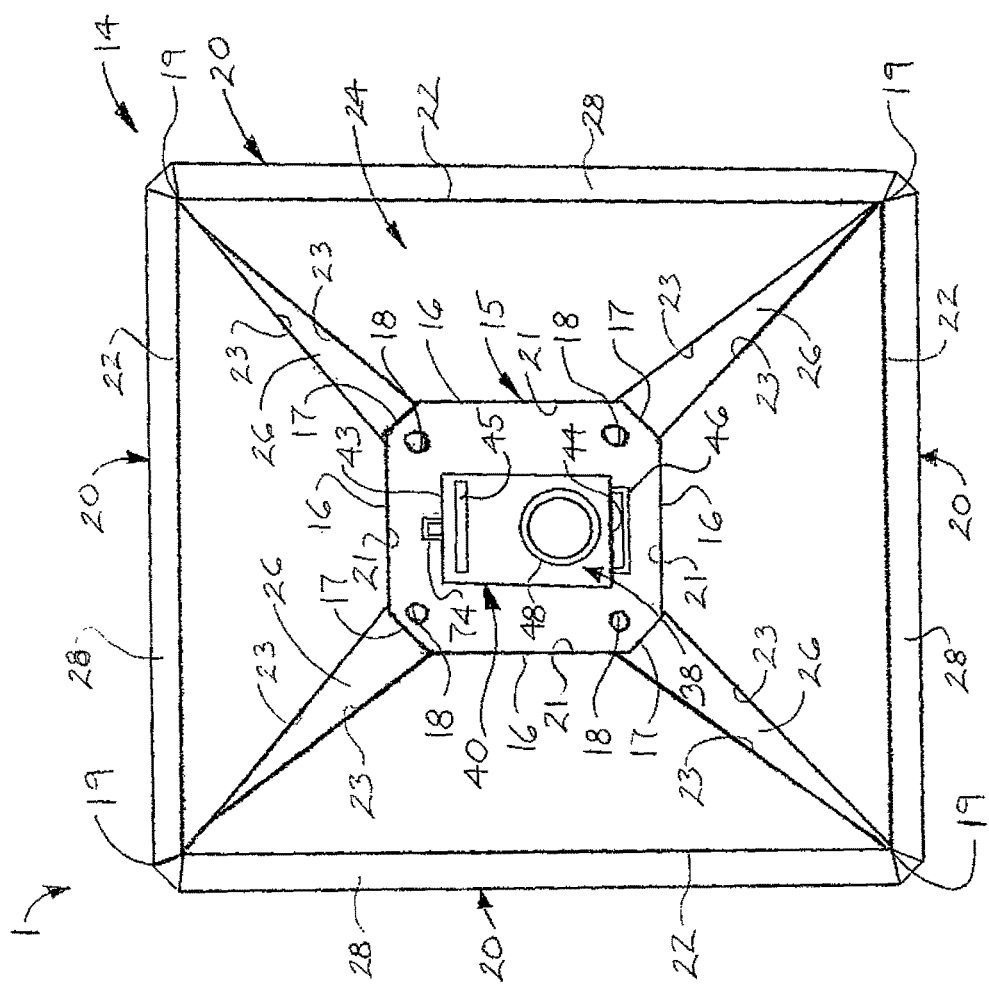
FIG. 2A is a top view of an illustrative swivel assembly and disassembly apparatus.
Figure 2B:
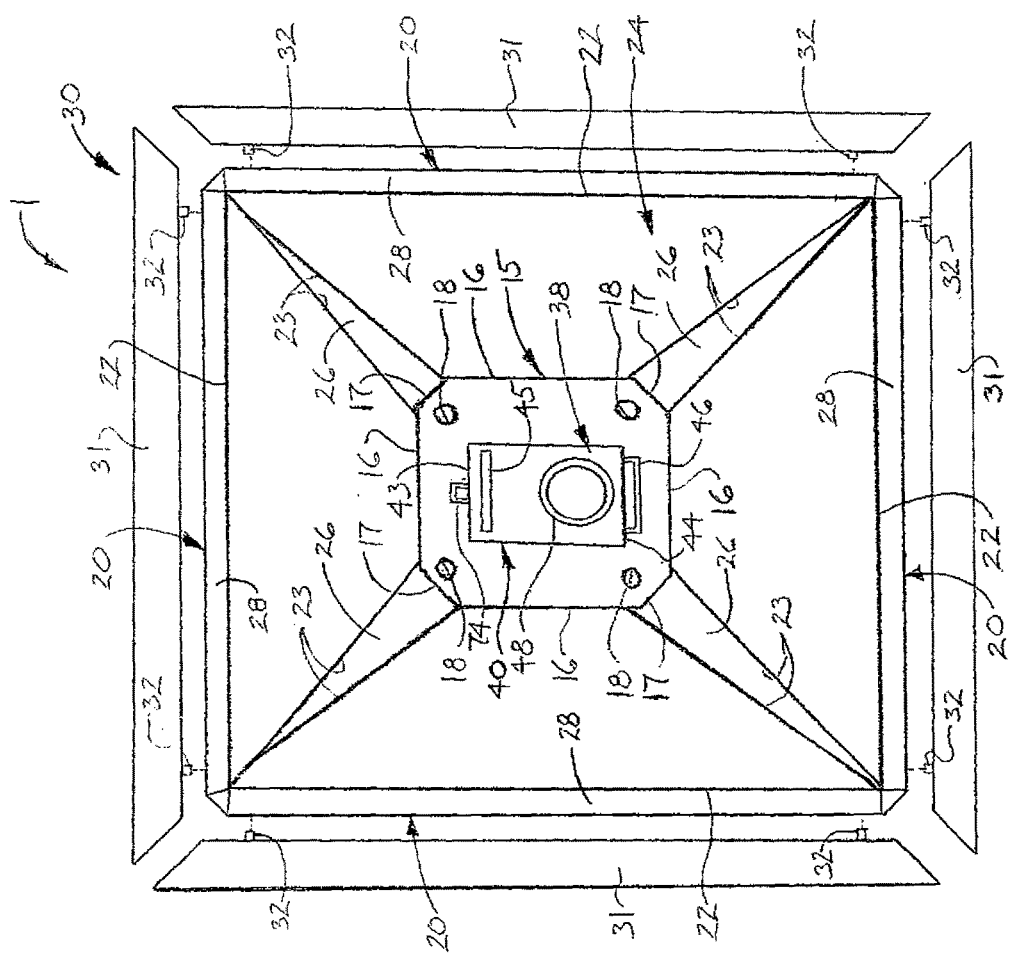
FIG. 2B is an exploded top view of an illustrative swivel assembly and disassembly apparatus, more particularly illustrating exemplary attachment of basin skirt segments of a basin extension skirt to a bearing collection basin of the apparatus according to typical application of the apparatus.
Figure 2C:
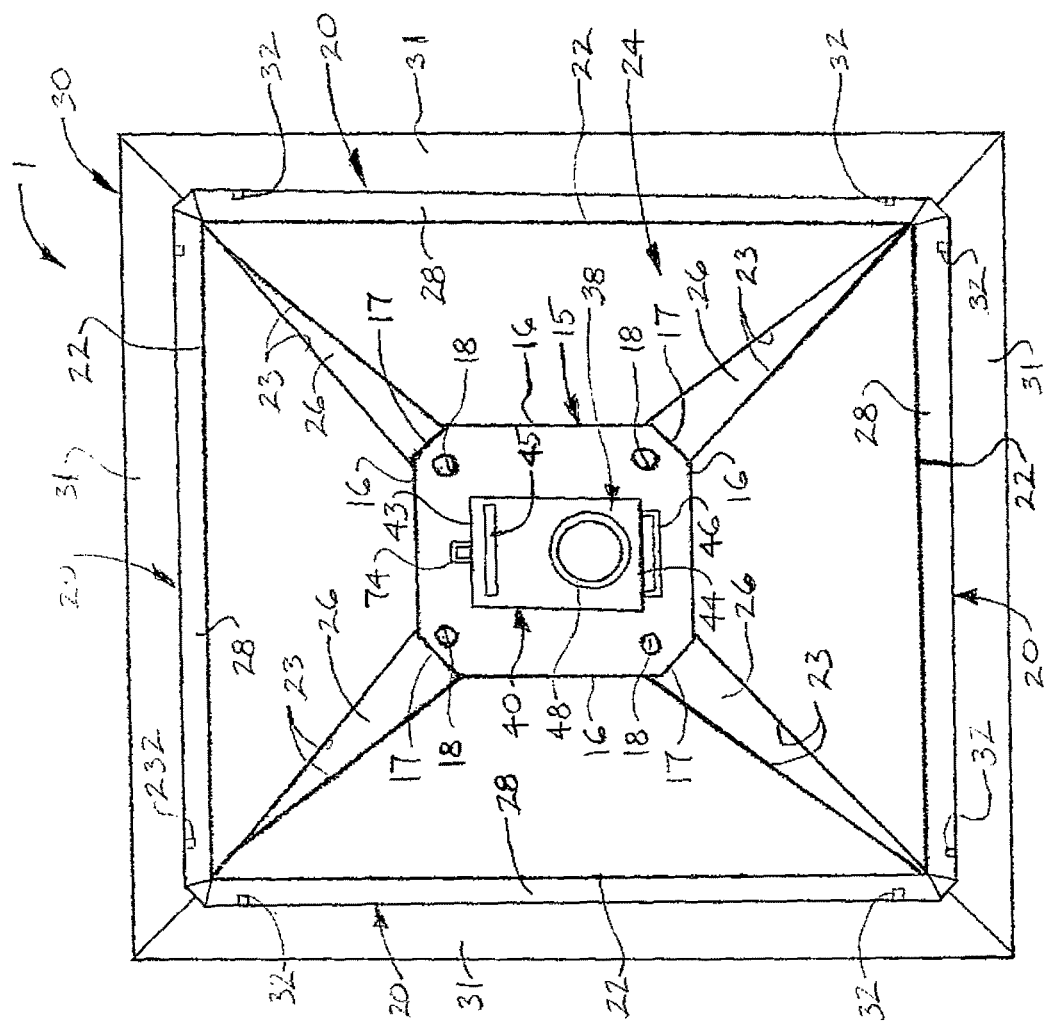
FIG. 2C is a top view of the illustrative swivel assembly and disassembly apparatus illustrated in FIG. 2B with the basin extension skirt attached to the bearing collection basin.

As illustrated in FIGS. 2B and 2C, in some embodiments, a basin extension skirt 30 may be attached to the bearing collection basin 14. The basin extension skirt 30 may enhance the ball bearing-collecting capability of the bearing collection basin 14 such as in applications in which the ball bearings 96 in the swivel 84 are particularly small and therefore, more likely to inadvertently become lost or misplaced. The basin extension skirt 30 may include multiple basin extension skirt segments 31 which may be detachably attached to the basin rim 28 of the bearing collection basin 14 using skirt attachment clips 32 and/or other suitable attachment device or technique known by those skilled in the art.

Figure 1:
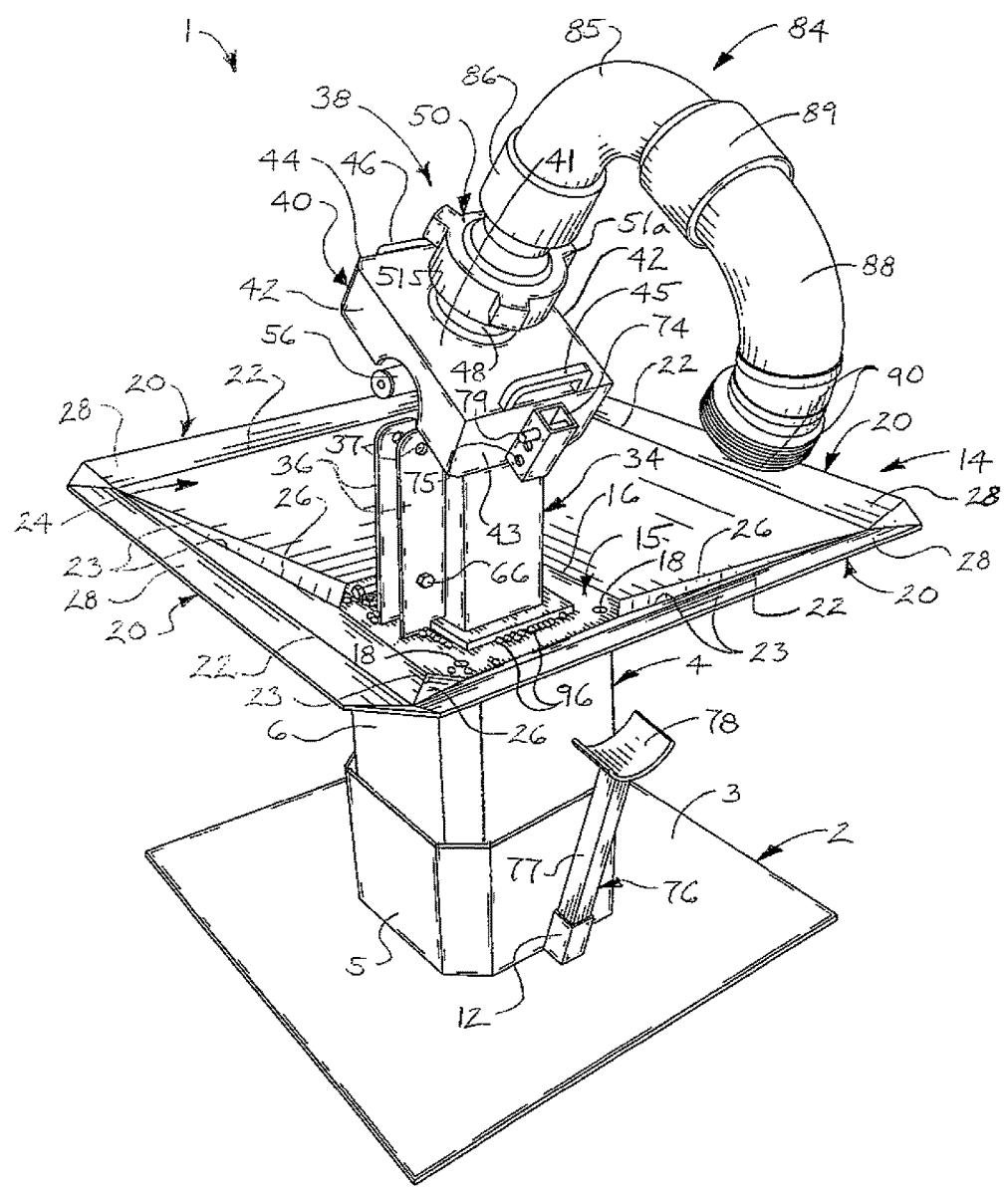
FIG. 1 is a front perspective view of an illustrative embodiment of the swivel assembly and disassembly apparatuses, with first and second swivel segments of a partially-assembled swivel attached to the apparatus according to typical application of the apparatus.

As particularly illustrated in FIGS. 1 and 2, the swivel head mount 34 of the apparatus 1 may extend upwardly from the basin bottom panel 15 of the bearing collection basin 14 at substantially the center of the basin interior 24. The swivel head mount 34 may be welded, bolted and/or otherwise attached to the basin bottom panel 15 according to the knowledge of those skilled in the art. As illustrated in FIGS. 7 and 9, in some embodiments, a pair of spaced-apart head mount flanges 35 may be provided on the swivel head mount 34 to facilitate attachment of the swivel assembly/disassembly head 40 to the swivel head mount 34 as will be hereinafter further described.

The swivel assembly/disassembly head 40 of the apparatus 1 is provided on the swivel head mount 34. The swivel assembly/disassembly head 40 may have any structure or design which is consistent with fixed or pivoting attachment of the swivel assembly/disassembly head 40 to the swivel head mount 34. As particularly illustrated in FIG. 7, in some embodiments, the swivel assembly/disassembly head 40 may include a top panel 41 and a pair of spaced-apart side panels 42, a front panel 43 and a rear panel 44 extending from the top panel 41. The swivel mounting mechanism 38 may be provided on the top panel 41 of the swivel assembly/disassembly head 40 to facilitate assembly of the swivel 84 on the swivel assembly/disassembly head 40 as will be hereinafter further described. A top handle 45 and a rear handle 46 may be provided on the top panel 41 and the rear panel 44, respectively, for manual positioning of the swivel assembly/disassembly head 40 in typical application of the apparatus 1 as will be hereinafter described.

The swivel assembly/disassembly head 40 may be mounted on the swivel head mount 34 according to the knowledge of those skilled in the art. In some embodiments, the swivel assembly/disassembly head 40 may be pivotally mounted on the swivel head mount 34. Accordingly, as illustrated in FIG. 7, a pair of spaced-apart assembly head flanges 47 may be provided on the swivel assembly/disassembly head 40. The assembly head flanges 47 may be welded and/or otherwise attached to the respective side panels 42 of the swivel assembly/disassembly head 40. The assembly head flanges 47 may align or register with the respective head mount flanges 35 on the swivel head mount 34. A head mount shaft 56 may be extended through registering shaft openings (not illustrated) in the head mount flanges 35 and the assembly head flanges 47, respectively. Thus, the swivel assembly/disassembly head 40 may be selectively positional in an upright position (FIG. 3), a forwardly-tilted position (FIG. 4) or a rearwardly-tilted position (FIG. 5) to facilitate selected orientations of the first swivel segment 85, the second swivel segment 88 and the third swivel segment 98 in assembly of the swivel 84 on the swivel assembly/disassembly head 40, as will be hereinafter described. In some embodiments, the head mount shaft 56 may be fitted with a grease grommet 58 which provides a supply of grease to the head mount shaft 56 according to the knowledge of those skilled in the art. In some embodiments, the swivel assembly/disassembly head 40 may be rotatably mounted on the swivel head mount 34 according to the knowledge of those skilled in the art such that the swivel assembly/disassembly head 40 can be selectively rotated 360 degrees above the bearing collection basin 14.

In some embodiments, a head positioning arm 64 may engage the swivel assembly/disassembly head 40 to secure the swivel assembly/disassembly head 40 at the upright position, the forwardly-tilted position or the rearwardly-tilted position. The head positioning arm 64 may be mounted on the swivel head mount 34 according to the knowledge of those skilled in the art. Accordingly, in some embodiments, a pair of spaced-apart head arm mount flanges 60 may extend from a rear surface of the swivel head mount 34. The head positioning arm 64 may be mounted between the head arm mount flanges 60. Multiple, spaced-apart fastener openings 65 (FIG. 2) may extend laterally through the head positioning arm 64 along its length. An arm adjustment fastener 66 may be extended through a pair of aligned fastener openings 61 in the respective head arm mount flanges 60 and through a registering one of the fastener openings 65 in the head positioning arm 64 to secure the head positioning arm 64 at the desired position to secure the swivel assembly/disassembly head 40 at the selected forwardly-tilted position, the upright position or the rearwardly-tilted position. In some embodiments, the head positioning arm 64 may be fitted with an arm handle 68 to aid in manual positioning of the head positioning arm 64 relative to the head arm mount flanges 60 in the upright or tilted positions of the swivel assembly/disassembly head 40. In some embodiments, a friction reducing component (not illustrated), such as a sheet or plate of ultra high molecular weight (UHMW) polyethylene, for example and without limitation, may be sandwiched between the head positioning arm 64 and the head arm mount flanges 60 to reduce friction as the head positioning arm 64 is slid relative to the head arm mount flanges 60.

As further illustrated in FIG. 2, in some embodiments, a pair of spaced-apart fastener storage flanges 36 may extend from a side surface of the swivel head mount 34. Multiple spaced-apart pairs of aligned fastener storage openings 37 may extend through the fastener storage flanges 36. Accordingly, when the head positioning arm 64 is not in use, the arm adjustment fastener 66 may be inserted through one of the aligned pairs of fastener storage openings 37 for ease of access when subsequent use of the head positioning arm 64 is desired.

In some embodiments, a head position adjustment mechanism 62 (illustrated in phantom in FIGS. 3-5 and 8-10) may engage the swivel assembly/disassembly head 40 to selectively orient the swivel assembly/disassembly head 40 at the upright position, the forwardly-tilted position or the rearwardly-tilted position. In some embodiments, the head position adjustment mechanism 62 may include a pneumatic or hydraulic head position adjustment cylinder 70 which may be supported by the bearing collection basin 14 or the swivel head mount 34. A head position adjustment piston 71 may be selectively extendable from and retractable into the head position adjustment cylinder 70 and may engage the swivel assembly/disassembly head 40 on one side of the head mount shaft 56. Upon extension and retraction, the head position adjustment piston 71 pivots the swivel assembly/disassembly head 40 about the head mount shaft 56. In other embodiments, the head position adjustment mechanism 62 may include any device or mechanism which is deemed suitable by those skilled in the art for the purpose of selectively pivoting the swivel assembly/disassembly head 40 on the swivel head mount 34. Non-limiting examples of mechanisms or devices which are suitable for the head position adjustment mechanism 62 include manual actuation devices, hydraulic actuation devices, pneumatic actuation devices, electric actuation devices and screw actuation devices.

The swivel mounting mechanism 38 may include any type of apparatus, device or mechanism which is suitable for supporting the first swivel segment 85 in an upright position on the swivel assembly/disassembly head 40 during assembly or disassembly of the swivel 84. In some embodiments, the swivel mounting mechanism 38 may include a swivel support collar 48 which may protrude upwardly from the top panel 41 of the swivel assembly/disassembly head 40. The swivel support collar 48 may be pinned inside a collar opening (not illustrated) in the top panel 41, or alternatively, may be welded and/or otherwise attached to the top panel 41 swivel assembly/disassembly head 40. A hammer nut 50 which may be provided on the first swivel segment 85 may interface with the swivel support collar 48. The hammer nut 50 may include an hammer nut collar 51 which may threadably engage the swivel support collar 48. Multiple hammer nut collar flanges 51a may extend outwardly from the hammer nut collar 51 to facilitate rotation and threading of the hammer nut 50 to the swivel support collar 48. Multiple swivel support collars 48 of different sizes may be interchangeably mounted on the swivel assembly/disassembly head 40 to accommodate correspondingly-sized hammer nuts 50 the first swivel segment 85 of swivels 84 having various diameters. For example and without limitation, in some embodiments, the swivel support collars 48 may be sufficiently sized to accommodate hammer nuts 50 on swivels 84 such as 2", 3" and 4" swivels, respectively. The hammer nut 50 may be threaded or otherwise attached to the first swivel segment 85 according to the knowledge of those skilled in the art.

As illustrated in FIGS. 3-5 and 8-10, in some embodiments, a swivel support arm 76 may be placed between the swivel assembly/disassembly head 40 and the first swivel segment 85 for stabilization purposes during assembly of the swivel 84. The swivel support arm 76 may include an elongated swivel support arm shaft 77. A swivel support arm cradle 78 may terminate the swivel support arm shaft 77.

A swivel arm mount collar 74 may be provided on the swivel assembly/disassembly head 40. In some embodiments, the swivel arm mount collar 74 may be welded and/or otherwise attached to the front panel 43 or other component of the swivel assembly/disassembly head 40. The swivel support arm 76 may be deployed in the vertical or upright functional position by inserting the lower end of the swivel support arm shaft 77 into the swivel arm mount collar 74 and inserting an arm fastener 79 through one of multiple fastener openings 75 in the swivel arm mount collar 74 and through a registering fastener opening (not illustrated) in the swivel support arm shaft 77. As the first swivel segment 85 is placed into engagement with the swivel mounting mechanism 38 on the swivel assembly/disassembly head 40, the swivel attachment sleeve 89 on the distal end of the first swivel segment 85 is rested in the swivel support cradle 78 of the swivel support arm 76. Thus, the swivel support arm 76 holds or secures the first swivel segment 85 in a stable and steady manner for subsequent attachment of the second swivel segment 88 to the first swivel segment 85 and the third swivel segment 98 (FIG. 10) to the second swivel segment 88 in assembly of the swivel 84, as will be hereinafter described. In some embodiments, a swivel arm stowage collar 12 may be provided on the apparatus base 2, such as on the base plate 3 adjacent to the lower basin support member 5. When not in use, the swivel support arm 76 can be selectively stowed by inserting the lower end of the swivel support arm shaft 77 in the swivel arm stowage collar 12, as illustrated in FIG. 1.

In typical application, the apparatus 1 facilitates assembly or disassembly of a swivel 84 for repair, replacement or maintenance of the various components of the swivel 84. In assembly of the swivel 84, the first swivel segment 85 may initially be secured in an upright position on the swivel assembly/disassembly head 40 by engagement of the first swivel segment 85 with the swivel mounting mechanism 38. Accordingly, as illustrated in FIG. 8, in some applications, a swivel support collar 48 which fits a hammer nut 50 on the first swivel segment 85 of the swivel 84 may be selected for the swivel mounting mechanism 38. Thus, the swivel support collar 48 may be inserted into a collar opening (not illustrated) in the top panel 41 of the swivel assembly/disassembly head 40 and pinned in place. The hammer nut collar 51 of the hammer nut 50 on the first swivel segment 85 may be threadably attached to the swivel support collar 48 on the swivel assembly/disassembly head 40 to deploy the first swivel segment 85 in an upright or upward-standing position on the swivel assembly/disassembly head 40. As illustrated in FIG. 9, in other applications, swivel support collars 48 of different sizes may be welded and/or otherwise fixedly attached to respective swivel assembly/disassembly heads 40 which are, in turn, detachably and interchangeably mounted on the swivel head mount 34. Thus, a swivel assembly/disassembly head 40 having the swivel support collar 48 the size of which fits the hammer nut 50 on the swivel 84 which is to be assembled may be selected for attachment to the swivel head mount 34. The first swivel segment 85 may then be attached to the swivel support collar 48 by threading the hammer nut 50 on the swivel support collar 48 preparatory to assembly of the swivel 84. In either application, prior to placement of the first swivel segment 85 on the swivel assembly/disassembly head 40, the swivel support arm 76 may be deployed in place in the swivel arm mount collar 74 on the swivel assembly/disassembly head 40 such that the swivel attachment sleeve 89 of the first swivel segment 85 is rested in the swivel support arm cradle 78 to stabilize the first swivel segment 85 on the swivel assembly/disassembly head 40, as was heretofore described.

After placement of the first swivel segment 85 on the swivel assembly/disassembly head 40, the second swivel segment 88 may be attached to the first swivel segment 85. Accordingly, as illustrated in FIG. 10, a set of ball bearings 96 may be placed in a ball bearing groove (not illustrated) which is typically inside the swivel attachment sleeve 89 on the first swivel segment 85, after which the second swivel segment 88 may be threadably attached to the swivel attachment sleeve 89 typically in the conventional manner. In the event that one or more of the ball bearings 96 inadvertently falls during placement of the ball bearings in the ball bearing groove, the errant ball bearing or bearings 96 fall into the bearing collection basin 14. In some embodiments, the ball bearings 96 may inadvertently fall from the bearing collection basin 14 through one or more of the bearing openings 18 (FIG. 2A) in the bearing collection basin 14 and into the underlying bearing collection basin 94 (FIGS. 6 and 7) in the apparatus base interior 2a of the basin support 4 of the apparatus base 2. The ball bearings 96 can be selectively retrieved from the bearing collection basin 94 for subsequent assembly of the swivel 84. After the second swivel segment 88 is coupled to the first swivel segment 85, the third swivel segment 98 may in like manner be coupled to the second swivel segment 88. After assembly, the swivel 84 may be removed from the swivel mounting mechanism 38 for attachment to a drill string (not illustrated) in a hydrocarbon production well, typically in the conventional manner. Disassembly of the swivel 84 may be carried out by reversing the steps for assembly which were heretofore described. When not in use, the swivel support arm 76 can be stowed in the swivel arm stowage collar 12, as was heretofore described with respect to FIG. 1. In assembly and disassembly of the swivel 84, the first swivel segment 85, the second swivel segment 88 and the third swivel segment 98 can be lifted and placed in or removed from the swivel 84 either manually or by using a suitable self-loading apparatus (not illustrated).

It will be appreciated by those skilled in the art that coupling of the second swivel segment 88 to the first swivel segment 85 and coupling of the third swivel segment 98 to the second swivel segment 88 in assembly of the swivel 84, and uncoupling of those components during disassembly of the swivel 84, occurs above the bearing collection basin 14. Thus, in the event that any of the ball bearings 96 inadvertently falls during assembly, the bearing collection basin 14 catches the ball bearings 96, which may be dispensed from the bearing collection basin 14 through the bearing opening or openings 18 and into the bearing collection container 94 (FIGS. 6 and 7) for later retrieval and use in the assembly process. It will be further appreciated by those skilled in the art that in some embodiments the swivel assembly/disassembly head 40 can be selectively deployed in the upright position (FIG. 3) or tilted in the forward position (FIG. 4) or the rearward position (FIG. 5) according to the preferences of the personnel who carry out the assembly or disassembly process to render the swivel 84 more accessible to personnel who typically stand to the side of the bearing collection basin 14 during assembly. The swivel assembly/disassembly head 40 can be selectively secured at the respective positions by deploying the head positioning arm 64 or by operating the head position adjustment mechanism 62 in various embodiments, as was set forth herein above. Moreover, in some embodiments, the swivel assembly/disassembly head 40 may be rotatably mounted on the swivel head mount 34 for additional positional capability.

As illustrated in FIG. 3, in some applications, a tool panel 80 (illustrated in phantom) may be suspended from the bearing collection basin 14 according to the knowledge of those skilled in the art. Various tools (not illustrated) which are used in assembly and disassembly of the swivel 84 may be stored in the tool panel 80 for ease of access. In some applications, a bearing tray 92 (illustrated in phantom) may be provided on the bearing collection basin 14. Ball bearings 96 (FIG. 1) may be placed in the bearing tray 92 for ease of access during assembly of the swivel 84. In some applications, the bearing tray 92 may be magnetically attached to the bearing collection basin 14.

Figure 11:
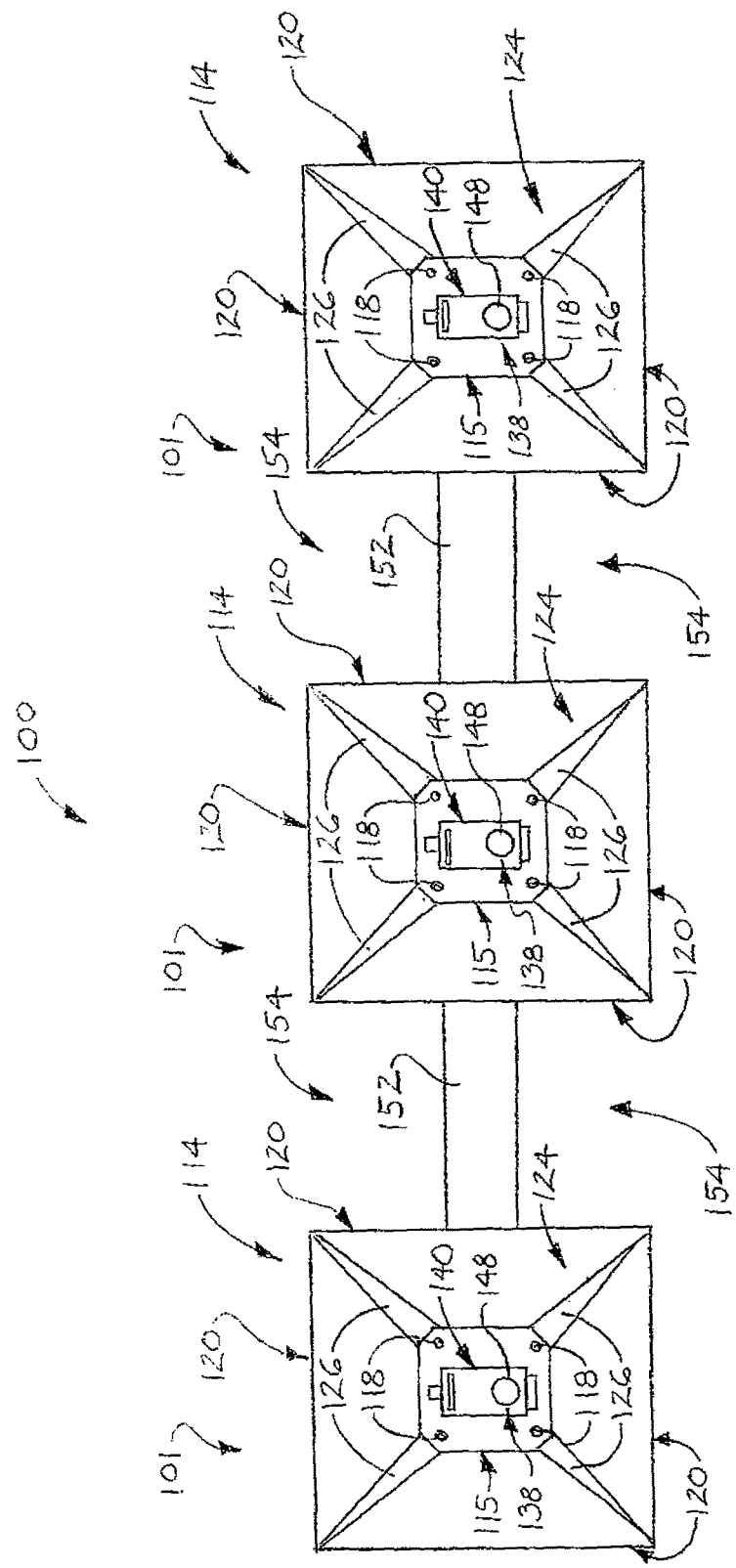
FIG. 11 is a top view of an illustrative embodiment of a swivel assembly and disassembly system.

Referring next to FIG. 11 of the drawings, an illustrative embodiment of a swivel assembly/disassembly system 100, hereinafter system 100, is illustrated. In the system 100, elements which are analogous to the respective elements of the apparatus 1 that was heretofore described with respect to FIGS. 1-10 are designated by the same numeral in the 101-199 series in FIG. 11. The system 100 may include multiple swivel assembly and disassembly apparatuses 101, each of which may have a design which is the same as or similar to that of the apparatus 1 which was heretofore described with respect to FIGS. 1-10. The apparatuses 101 may be disposed in spaced-apart relationship to each other on a floor or other support surface (not illustrated). An assembly connector 152 may connect adjacent apparatuses 101 to each other in the system 100. At least one walk space 154 may be provided between adjacent apparatuses 101.

In application of the system 100, the multiple apparatuses 101 may be operated simultaneously to assemble or disassemble swivels 84 typically as was heretofore described with respect to operation of the apparatus 1. Personnel may access the swivel assembly/disassembly head 40 of each apparatus 101 by standing at the sides of the bearing collection basin 114 or in the walk spaces 154.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A swivel assembly and disassembly apparatus for assembly and disassembly of a swivel, comprising:
   an apparatus base, the apparatus base including an apparatus base interior and a bearing container opening in the apparatus base and communicating with the apparatus base interior, the bearing container opening sized and configured to accommodate a bearing collection container in placement of the bearing collection container in and removal from the apparatus base interior;
   at least one bearing opening in the apparatus base;
   a bearing collection basin carried by the apparatus base;
   a swivel head mount carried by the bearing collection basin;
   a swivel assembly/disassembly head carried by the swivel head mount; and a swivel mounting mechanism carried by the swivel assembly/disassembly head.

2. The apparatus of claim 1 wherein the apparatus base is height-adjustable.

3. The apparatus of claim 1 wherein the bearing collection basin comprises a basin bottom panel and a plurality of main basin panels angling outwardly and upwardly from the basin bottom panel, and wherein the swivel head mount is carried by the basin bottom panel.

4. The apparatus of claim 3 further comprising a plurality of basin corner panels between the main basin panels, respectively.

5. The apparatus of claim 1 further comprising a swivel arm stowage collar carried by the apparatus base, a swivel arm mount collar carried by the swivel assembly/disassembly head and a swivel support arm detachably carried by one of the swivel arm stowage collar and the swivel arm mount collar.

6. The apparatus of claim 5 wherein the swivel support arm comprises an elongated swivel support arm shaft and a concave swivel support arm cradle carried by the swivel support arm shaft.

7. A swivel assembly and disassembly apparatus for assembly and disassembly of a swivel, comprising:
- an apparatus base including a base plate and a basin support carried by the base plate, the apparatus base including an apparatus base interior and a bearing container opening in the apparatus base and communicating with the apparatus base interior, the bearing container opening sized and configured to accommodate a bearing collection container in placement of the bearing collection container in and removal from the apparatus base interior;
- at least one bearing opening in the apparatus base;
- a bearing collection basin carried by the basin support of the apparatus base, the bearing collection basin having a basin interior;
- a swivel head mount carried by the bearing collection basin in the basin interior;
- a swivel assembly/disassembly head pivotally carried by the swivel head mount; and
- a swivel mounting mechanism including a swivel support collar carried by the swivel assembly/disassembly head.

8. The apparatus of claim 7 wherein the apparatus base is height-adjustable, and further comprising a basin height adjusting mechanism engaging the bearing collection basin.

9. The apparatus of claim 7 wherein the bearing collection basin comprises a basin bottom panel having a plurality of bottom panel edges; a plurality of main basin panels angling outwardly and upwardly from the bottom panel edges, respectively, of the basin bottom panel; a plurality of basin corner panels between the main basin panels, respectively; and a basin interior formed by and between the basin bottom panel, the main basin panels and the basin corner panels, the basin bottom panel at substantially a center of the basin interior.

10. The apparatus of claim 7 further comprising a head position adjusting mechanism carried by the bearing collection basin and engaging the swivel assembly/disassembly head.

11. The apparatus of claim 7 further comprising a swivel arm stowage collar carried by the apparatus base, a swivel arm mount collar carried by the swivel assembly/disassembly head and a swivel support arm detachably carried by one of the swivel arm stowage collar and the swivel arm mount collar.

12. The apparatus of claim 11 wherein the swivel support arm comprises an elongated swivel support arm shaft and a concave swivel support arm cradle carried by the swivel support arm shaft.

13. A swivel assembly and disassembly system for assembly and disassembly of swivels, comprising:
- a plurality of swivel assembly and disassembly apparatuses disposed in spaced-apart, adjacent relationship to each other, each of the plurality of swivel assembly and disassembly apparatuses including:
  - an apparatus base including an apparatus base interior and further comprising a bearing container opening in the apparatus base and communicating with the apparatus base interior, the bearing container opening sized and configured to accommodate a bearing collection container in placement of the bearing collection container in and removal from the apparatus base interior;
  - at least one bearing opening in the apparatus base;
  - a bearing collection basin carried by the apparatus base, the bearing collection basin having a basin interior;
  - a swivel head mount carried by the bearing collection basin in the basin interior;
  - a swivel assembly/disassembly head carried by the swivel head mount; and
  - a swivel mounting mechanism having a swivel support collar carried by the swivel assembly/disassembly head;
- an assembly connector connecting adjacent ones of the plurality of swivel assembly and disassembly apparatuses; and
- at least one walk space between adjacent ones of the plurality of swivel assembly and disassembly apparatuses.

14. The apparatus of claim 13 wherein the bearing collection basin comprises a basin bottom panel having a plurality of bottom panel edges; a plurality of main basin panels angling outwardly and upwardly from the bottom panel edges, respectively, of the basin bottom panel; a plurality of basin corner panels between the main basin panels, respectively; and a basin interior formed by and between the basin bottom panel, the main basin panels and the basin corner panels, the basin bottom panel at substantially a center of the basin interior.

* * * * *